United States Patent
Staudt

(10) Patent No.: US 8,522,446 B1
(45) Date of Patent: Sep. 3, 2013

(54) LEVEL ASSEMBLY

(76) Inventor: Karl E. Staudt, Helotes, TX (US)

( * ) Notice: Subject to any disclaimer, the term of this patent is extended or adjusted under 35 U.S.C. 154(b) by 0 days.

(21) Appl. No.: 12/633,194

(22) Filed: Dec. 8, 2009

(51) Int. Cl.
*G01C 9/32* (2006.01)

(52) U.S. Cl.
USPC ..................................... 33/348.2; 33/DIG. 21

(58) Field of Classification Search
USPC ........................... 33/227, 348, 348.2, DIG. 21
See application file for complete search history.

(56) References Cited

U.S. PATENT DOCUMENTS

| | | | |
|---|---|---|---|
| 2,922,874 A * | 1/1960 | Clerk et al. | ............. 33/348.2 |
| 3,046,672 A * | 7/1962 | Lace | ................. 33/348 |
| 3,584,212 A | 6/1971 | Hansen | |
| 4,506,450 A | 3/1985 | Fleming et al. | |
| 4,654,977 A | 4/1987 | Pakus | |
| 4,876,798 A * | 10/1989 | Zimmerman | ............. 33/348.2 |
| 5,020,232 A | 6/1991 | Whiteford | |
| D318,434 S | 7/1991 | Wurst | |
| 5,180,221 A * | 1/1993 | Yoder | ............. 33/348.2 |
| 5,561,911 A | 10/1996 | Martin | |
| D415,436 S | 10/1999 | Martone | |
| 5,966,826 A * | 10/1999 | Ho | ............. 33/DIG. 21 |
| 6,037,874 A | 3/2000 | Heironimus | |
| 6,763,597 B2 * | 7/2004 | Lysen | ............. 33/227 |
| D498,152 S | 11/2004 | Hickey | |
| 7,024,781 B1 * | 4/2006 | Cowie | ............. 33/348 |

* cited by examiner

*Primary Examiner* — G. Bradley Bennett

(57) ABSTRACT

A level assembly includes an elongated housing that has a first end, a second end and a perimeter wall. The perimeter wall includes a front wall, a back wall, a first side wall and a second side wall. The housing has a plurality of apertures therein. Each of the apertures extends into the front wall. Each of the apertures has one of a plurality of levels mounted therein. A plurality of light emitters is mounted in the housing. Each of the apertures has one of the light emitters directed therein. The light emitters illuminate adjacently positioned ones of the levels when the light emitters are turned on. A power supply is mounted within the housing and is electrically coupled to the light emitters. An actuator is mounted on the housing and is electrically coupled to the power supply. The actuator is actuated to turn the light emitters on or off.

5 Claims, 4 Drawing Sheets

LEVEL ASSEMBLY

BACKGROUND OF THE DISCLOSURE

Field of the Disclosure

The disclosure relates to level devices and more particularly pertains to a new level device for assisting a person in determining the orientation of surface.

SUMMARY OF THE DISCLOSURE

An embodiment of the disclosure meets the needs presented above by generally comprising an elongated housing having a first end, a second end and a perimeter wall extending between the first and second ends. The perimeter wall includes a front wall, a back wall, a first side wall and a second side wall. The housing has a plurality of apertures therein. Each of the apertures extends into the front wall. Each of the apertures has one of a plurality of levels mounted therein. A plurality of light emitters is mounted in the housing. Each of the apertures has one of the light emitters directed therein. The light emitters illuminate adjacently positioned ones of the levels when the light emitters are turned on. A power supply is mounted within the housing and is electrically coupled to the light emitters. An actuator is mounted on the housing and is electrically coupled to the power supply. The actuator is actuated to turn the light emitters on or off.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
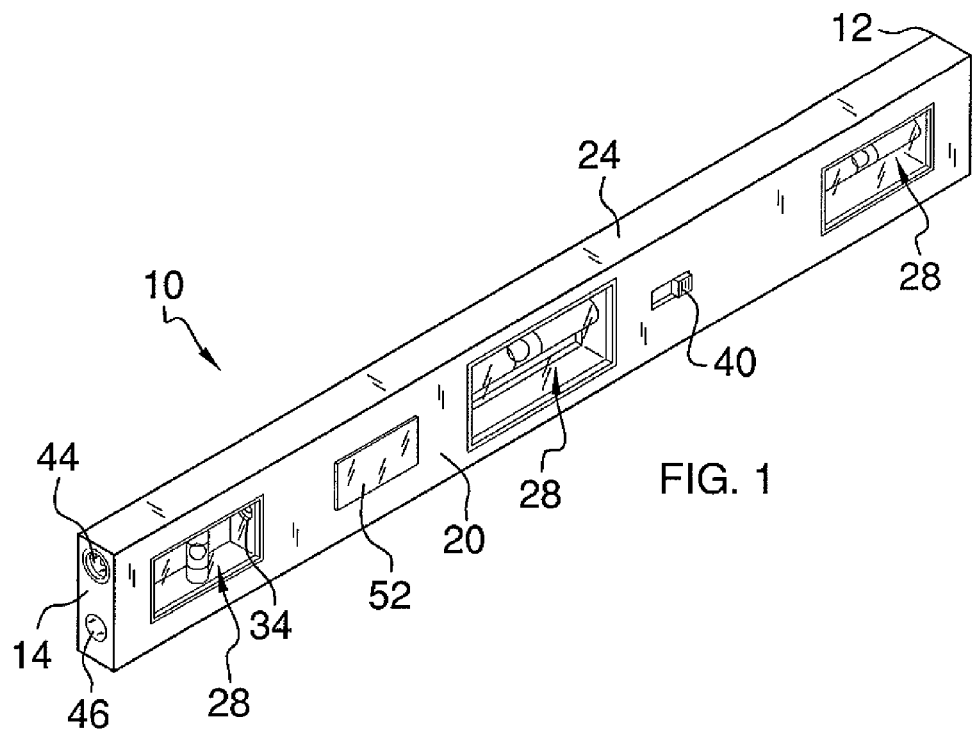
FIG. 1 is a front perspective view of a level assembly according to an embodiment of the disclosure.

With reference now to the drawings, and in particular to FIGS. 1 through 6 thereof, a new level device embodying the principles and concepts of an embodiment of the disclosure and generally designated by the reference numeral 10 will be described.

As best illustrated in FIGS. 1 through 6, the level assembly 10 generally comprises an elongated housing 12 having a first end 14, a second end 16 and a perimeter wall 18 extending between the first 14 and second 16 ends. The perimeter wall 18 includes a front wall 20, a back wall 22, a first side wall 24 and a second side wall 26. The housing 12 has a plurality of apertures 28 therein. Each of the apertures 28 extends into the front wall 20.

Figure 2:
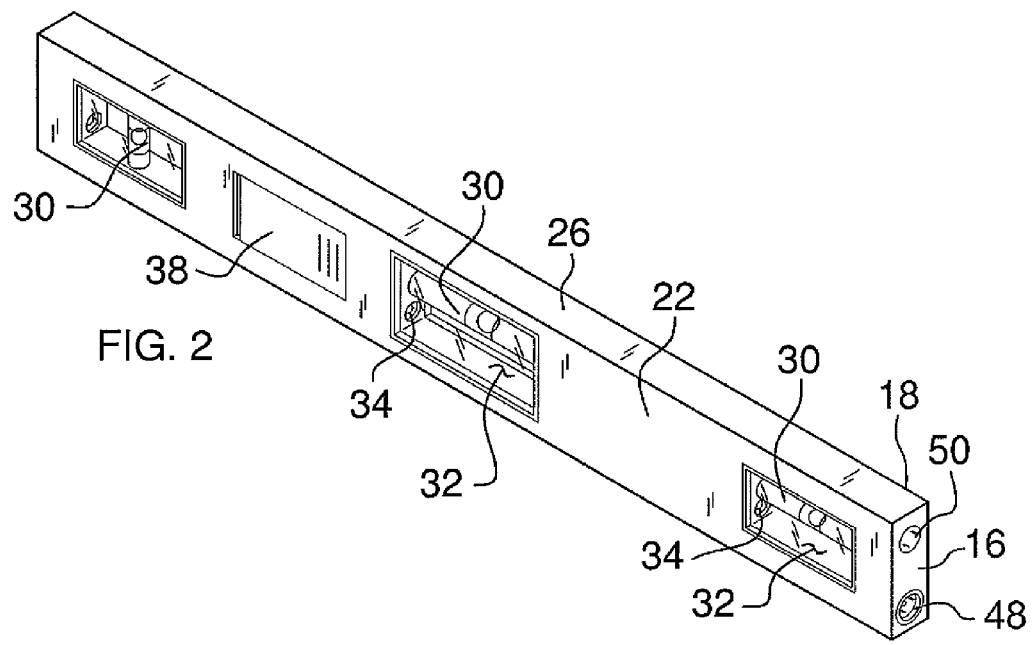
FIG. 2 is a rear perspective view of an embodiment of the disclosure.
Figure 3:
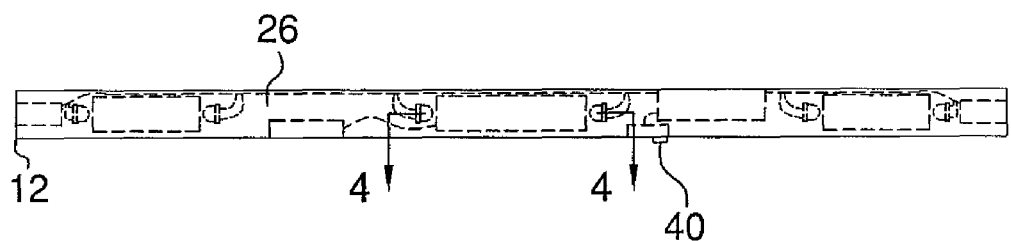
FIG. 3 is a side view of an embodiment of the disclosure.

A plurality of bubble levels 30 is provided. Each of the apertures 28 has one of the levels 30 mounted therein. At least one of the levels 30 is orientated horizontally when a longitudinal axis of the housing 12 is horizontally orientated and at least one of the levels 30 is orientated vertically when the longitudinal axis of the housing 12 is horizontally orientated. The longitudinal axis of the housing 12 extends through the first 14 and second 16 ends. A plurality of coverings 32 is attached to the housing 12. Each of the apertures 28 is covered with one of the coverings 32. As shown in FIG. 2, the apertures 28 may extend through the back wall 22 and then coverings 32 are also attached to the back wall 22 to cover the apertures 28 here as well.

Figure 4:
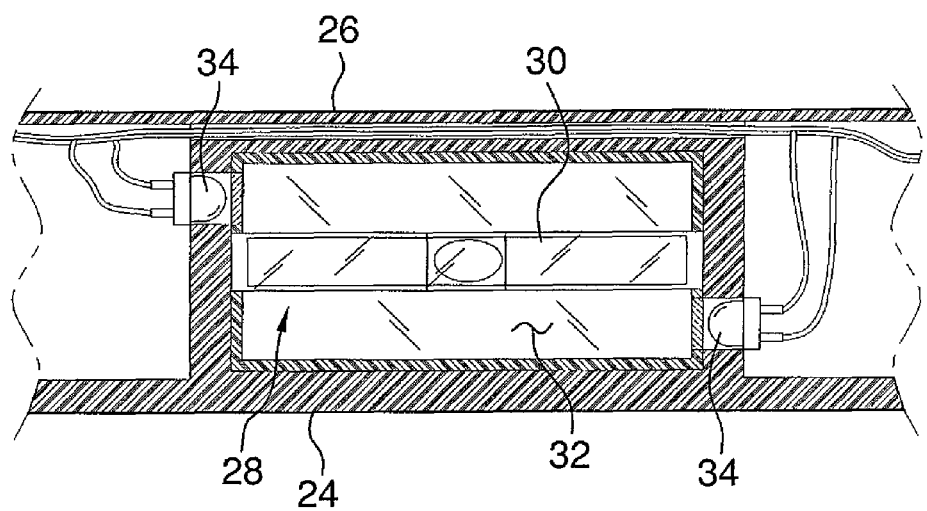
FIG. 4 is a cross-sectional view of an embodiment of the disclosure taken along line 4-4 of FIG. 3.
Figure 5:
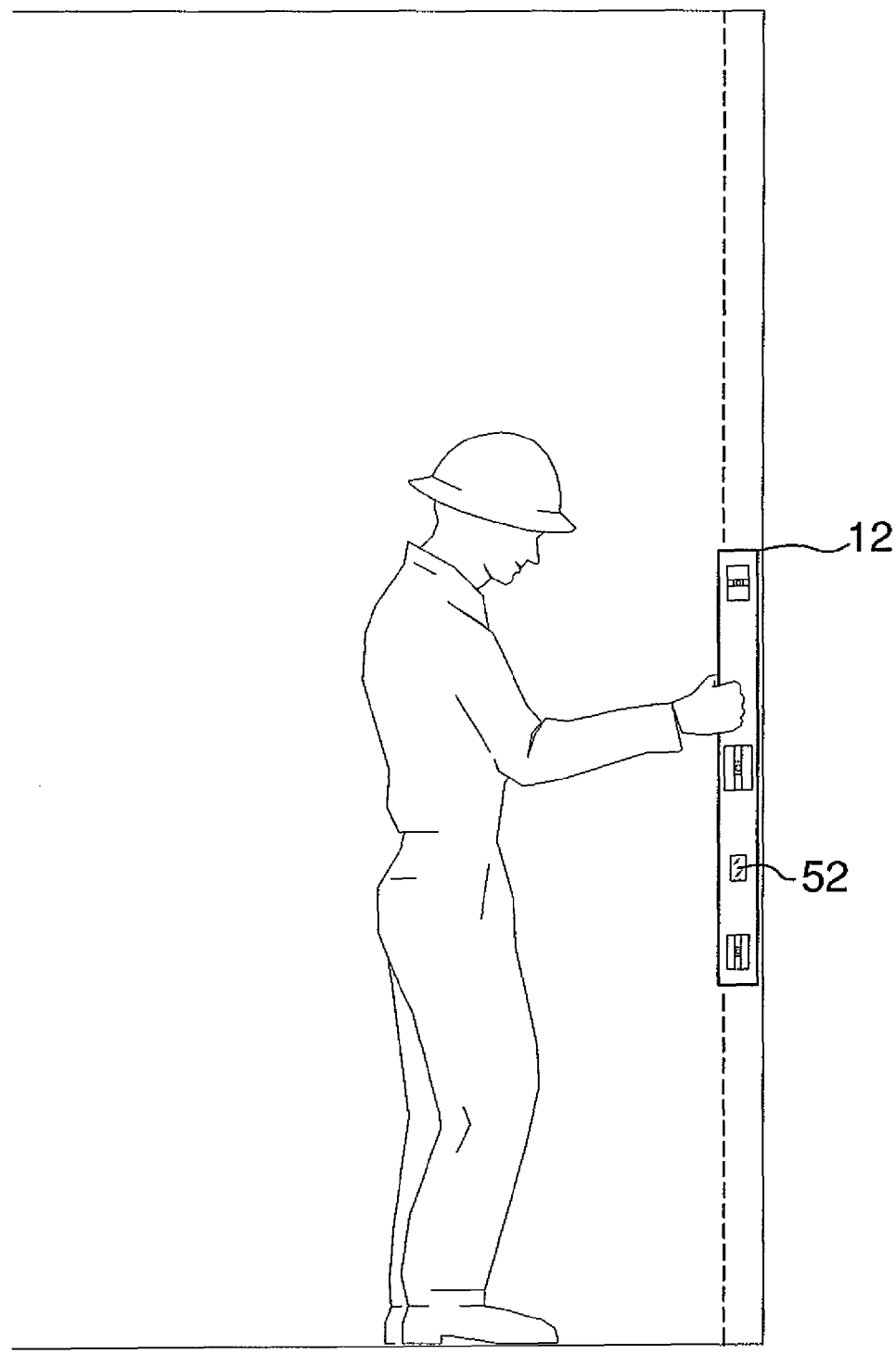
FIG. 5 is a front in-use view of an embodiment of the disclosure.
Figure 6:
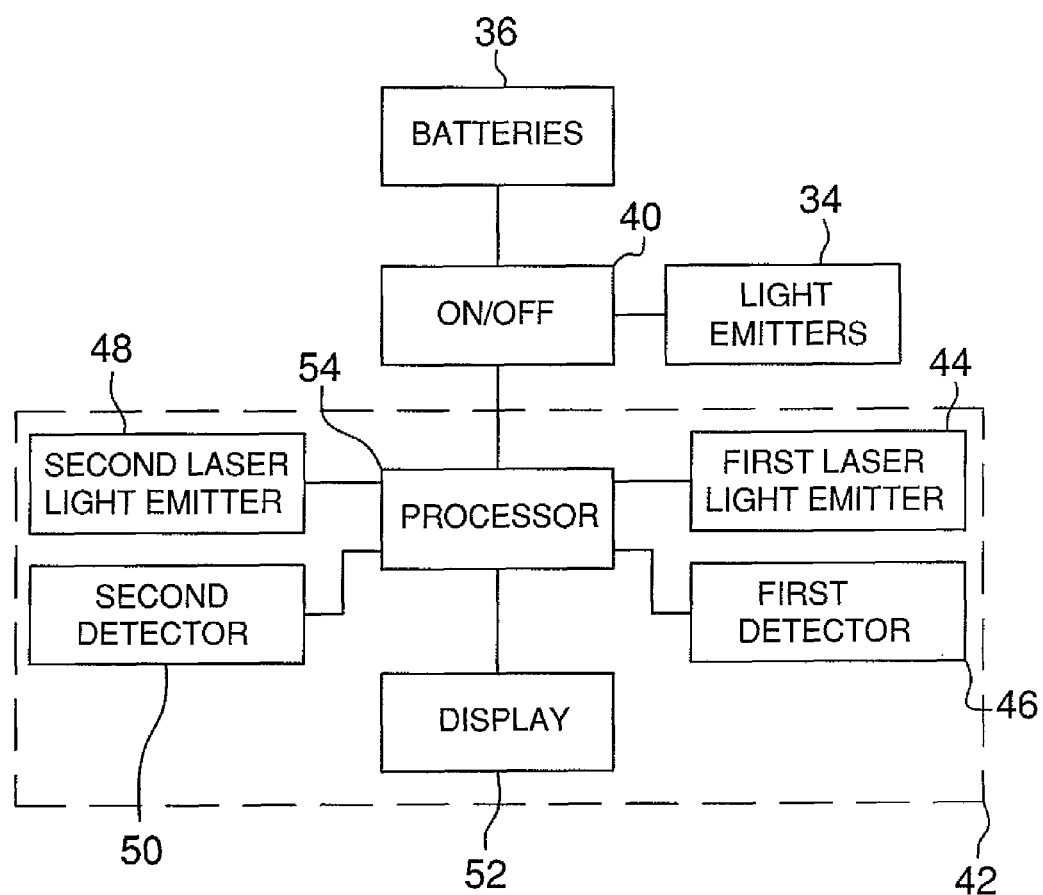
FIG. 6 is a schematic view of an embodiment of the disclosure.

A plurality of light emitters 34 is mounted in the housing 12. Each of the apertures 28 has one of the light emitters 34 directed therein. The light emitters 34 illuminate adjacently positioned ones of the levels 30 when the light emitters 34 are turned on. The light emitters 34 may comprise light emitting diodes. As shown in FIG. 4, two light emitters 34 may be directed into each of the apertures 30 and positioned on either side of the levels 30 to ensure that the levels 30 are viewable from multiple angles. A power supply 36 is mounted within the housing 12 and is electrically coupled to the light emitters. The power supply 12 may combine one or more batteries removably positioned in a battery compartment located within the housing 12 and accessed through a removable panel 38. An actuator 40 is mounted on the housing 12 and is electrically coupled to the power supply 38. The actuator 40 is actuated to turn the light emitters 34 on or off.

A laser range finder 42 is mounted in the housing 12 to determine a distance between two walls positioned on opposite sides of the housing 12. The laser range finder 42 includes a first laser light emitter 44 that is mounted in the first end 14 and is directed outwardly of the housing 12. The first laser light emitter 44 emits a laser beam orientated perpendicular to the vertically orientated bubble level 30. A first light detector 46 is mounted in the first end 14 and detects reflected light from the first laser light 44. A second laser light emitter 48 is mounted in the second end 16 and is directed outwardly of the housing 12. The second laser light emitter 48 emits a laser beam orientated perpendicular to the vertically orientated bubble level 30. A second light detector 50 is mounted in the second end 16 and detects reflected light from the second laser light 48. A display 52 is mounted in the housing 12 and is electrically coupled to a processor 54 electrically coupled to the first 44 and second 48 light detectors. The processor 54 is programmed in a conventional manner for range finders and the first 44 and second 48 laser light emitters and first 46 and second 48 light detectors are also conventional for laser finders. Additionally, the processor 54 may be programmed to determine the distance from just one of the laser light emitters 44, 48 to a wall surface if only one of the laser light emitters 44, 48 is detecting light such as if one of the first 14 or second 16 ends is in abutment with a wall surface. The display 52 may be a liquid crystal display which displays the distance between oppositely positioned walls.

In use, the housing 12 is used in a conventional manner to check the orientation of an object. The assembly 10 may include levels 30 of varying orientations depending on the need and usage of the person utilizing the assembly 10. The light emitters 34 provide illumination for the levels 30 to ensure that the person can adequately see the levels 30. If needed, the range finder 42 may be used for measuring distances between two points or between the housing 12 and another point.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A level assembly comprising:
    an elongated housing having a first end, a second end and a perimeter wall extending between said first and second ends, said perimeter wall including a front wall, a back wall, a first side wall and a second side wall, said housing having a plurality of apertures therein, each of said apertures extending into said front wall;
    a plurality of bubble levels, each of said apertures having one of said levels mounted therein;
    a plurality of light emitters being mounted in said housing, each of said apertures having one of said light emitters directed therein, said light emitters illuminating adjacently positioned ones of said levels when said light emitters are turned on;
    a power supply being mounted within said housing and being electrically coupled to said light emitters;
    an actuator being mounted on said housing and being electrically coupled to said power supply, said actuator being actuated to turn said light emitters on or off; and
    a laser range finder being mounted in said housing to determine a distance between two walls positioned on opposite sides of said housing.

2. The assembly according to claim 1, wherein at least one of said levels is orientated horizontally when a longitudinal axis of said housing is horizontally orientated, at least one of said levels is orientated vertically when the longitudinal axis of said housing is horizontally orientated.

3. The assembly according to claim 1, wherein said laser range finder includes:
    a first laser light emitter being mounted in said first end and directed outwardly of said housing, said first laser light emitter emitting a laser beam orientated perpendicular to the vertically orientated bubble level;
    a first light detector being mounted in said first end and detecting reflected light from said first laser light;
    a second laser light emitter being mounted in said second end and directed outwardly of said housing, said second laser light emitter emitting a laser beam orientated perpendicular to the vertically orientated bubble level;
    a second light detector being mounted in said second end and detecting reflected light from said second laser light; and
    a display being mounted in said housing and being electrically coupled to a processor electrically coupled to said first and second light detectors, said display displaying the distance between oppositely positioned walls.

4. The assembly according to claim 1, further including a plurality of coverings being attached to said housing, each of said apertures being covered with one of said coverings.

5. A level assembly comprising:
    an elongated housing having a first end, a second end and a perimeter wall extending between said first and second ends, said perimeter wall including a front wall, a back wall, a first side wall and a second side wall, said housing having a plurality of apertures therein, each of said apertures extending into said front wall;
    a plurality of bubble levels, each of said apertures having one of said levels mounted therein, at least one of said levels being orientated horizontally when a longitudinal axis of said housing is horizontally orientated, at least one of said levels being orientated vertically when the longitudinal axis of said housing is horizontally orientated;
    a plurality of light emitters being mounted in said housing, each of said apertures having one of said light emitters directed therein, said light emitters illuminating adjacently positioned ones of said levels when said light emitters are turned on;
    a power supply being mounted within said housing and being electrically coupled to said light emitters;
    an actuator being mounted on said housing and being electrically coupled to said power supply, said actuator being actuated to turn said light emitters on or off;
    a laser range finder being mounted in said housing to determine a distance between two walls positioned on opposite sides of said housing, said laser range finder including;
    a first laser light emitter being mounted in said first end and directed outwardly of said housing, said first laser light emitter emitting a laser beam orientated perpendicular to the vertically orientated bubble level;
    a first light detector being mounted in said first end and detecting reflected light from said first laser light;
    a second laser light emitter being mounted in said second end and directed outwardly of said housing, said second laser light emitter emitting a laser beam orientated perpendicular to the vertically orientated bubble level;
    a second light detector being mounted in said second end and detecting reflected light from said second laser light;
    a display being mounted in said housing and being electrically coupled to a processor electrically coupled to said first and second light detectors, said display displaying the distance between oppositely positioned walls; and
    a plurality of coverings being attached to said housing, each of said apertures being covered with one of said coverings.

* * * * *